US007298988B2

(12) United States Patent
Nakayama

(10) Patent No.: US 7,298,988 B2
(45) Date of Patent: Nov. 20, 2007

(54) IMAGE FORMING APPARATUS

(75) Inventor: Yoshiyuki Nakayama, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 314 days.

(21) Appl. No.: 11/214,935

(22) Filed: Aug. 31, 2005

(65) Prior Publication Data

US 2006/0051125 A1 Mar. 9, 2006

(30) Foreign Application Priority Data

Sep. 8, 2004 (JP) ............................ 2004-261616

(51) Int. Cl.
*G03G 15/00* (2006.01)

(52) U.S. Cl. ...................................... 399/110; 399/114

(58) Field of Classification Search ................ 399/107, 399/110, 111, 113, 114, 125
See application file for complete search history.

(56) References Cited

U.S. PATENT DOCUMENTS

| | | | | |
|---|---|---|---|---|
| 5,950,050 | A * | 9/1999 | Shirasaki et al. | 399/124 |
| 6,134,403 | A | 10/2000 | Haneda et al. | 399/107 |
| 6,208,828 | B1 * | 3/2001 | Awai et al. | 399/361 |
| 6,263,185 | B1 * | 7/2001 | Kato et al. | 399/381 |
| 6,384,940 | B1 | 5/2002 | Kawai et al. | 358/474 |
| 6,510,301 | B2 * | 1/2003 | Tanaka | 399/125 |
| 6,798,430 | B2 | 9/2004 | Sato | 347/115 |
| 2001/0055499 | A1 | 12/2001 | Sato | 399/111 |
| 2002/0044305 | A1 | 4/2002 | Kawai et al. | 358/474 |

FOREIGN PATENT DOCUMENTS

| | | | |
|---|---|---|---|
| JP | 10-171327 | A | 6/1998 |
| JP | 10-293516 | A | 11/1998 |
| JP | 11-008723 | A | 1/1999 |
| JP | 11-214861 | A | 8/1999 |
| JP | 2000-66472 | A | 3/2000 |
| JP | 2001-356548 | A | 12/2001 |

* cited by examiner

*Primary Examiner*—Hoan Tran
(74) *Attorney, Agent, or Firm*—Fitzpatrick, Cella, Harper & Scinto

(57) ABSTRACT

An image forming apparatus has an apparatus main body provided with an image forming portion for forming an image, an opening formed in the apparatus main body, an openable and closable cover for opening and closing the opening, and provided with a first cover pivotably provided in the apparatus main body, and a second cover pivotably provided on the first cover, and an image reading device provided above the opening for reading the image of an original, and when the first cover is pivotably moved in a direction to open the opening relative to the apparatus main body, the second cover is pivotably moved to the opening side relative to the first cover, and when the openable and closable cover has opened the opening, the openable and closable cover maintains a state in which it has opened the opening.

21 Claims, 15 Drawing Sheets

IMAGE FORMING APPARATUS

BACKGROUND OF THE INVENTION

1. Field of the Invention

The invention relates to an image forming apparatus provided with an openable and closable cover.

2. Description of Related Art

Image forming apparatus include a multi-function printer (hereinafter referred to as the "MFP"), a copying machine, a printer, a facsimile apparatus and a compound machine of these. Some of the image forming apparatus are provided with an interchanging cover for opening and closing an apparatus main body to interchange a process cartridge provided with a photosensitive drum on which a toner image is formed, and a developing device for developing the photosensitive drum (see Japanese Patent Application Laid-open No. 2001-356548).

Also, some image forming apparatuses are provided with an openable and closable cover for interchanging a developing device for developing an image forming member unit (see Japanese Patent Application Laid-open No. H10-171327). Also, an openable and closable cover is described in Japanese Patent Application Laid-open No. 2000-66472.

However, in the image forming apparatus of Japanese Patent Application Laid-open No. 2001-356548, the interchanging cover is used in common as an entire side of the apparatus, and this leads to the problem that there is required a wide space for opening and closing the interchanging cover.

The image forming apparatus of Japanese Patent Application Laid-open No. H10-171327 is designed such that an apparatus main body is upwardly opened in such a manner as to upwardly bend the openable and closable cover and therefore, there is required a wide space for opening and closing the openable and closable cover.

In Japanese Patent Application. Laid-open No. 2000-66472, there is described a construction in which an image reading device for reading the image of an original is pivotally moved. Also, as another embodiment, there is disclosed an openable and closable cover which is inwardly bent.

However, in the embodiment wherein the image reading device is pivotally moved, if an attempt is made to make large an opening in which the openable and closable cover is opened and closed, the openable and closable cover becomes large and therefore, an area required for the pivotal movement of the openable and closable cover becomes large. Accordingly, the image reading device must be greatly pivotally moved.

Also, in the embodiment of the inwardly bent openable and closable cover disclosed in Japanese Patent Application Laid-open No. 2000-66472, even if the openable and closable cover is pivotally moved, maintenance for an image forming apparatus main body must be done below the fixed image reading device and therefore, the working property for the maintenance is poor. To improve this working property, the cover can be greatly separated upwardly from the image forming apparatus main body. Consequently, if an attempt is made to improve the working property, the vertical size of the apparatus will become large.

SUMMARY OF THE INVENTION

The present invention has as its object to provide an image forming apparatus in which downsizing is achieved by reducing the space for opening and closing an openable and closable cover and yet, in which the working property for maintenance or the like is improved.

In order to achieve the above object, the image forming apparatus of the present invention has an apparatus main body provided with an image forming portion for forming an image, an opening formed in the apparatus main body, an openable and closable cover for opening and closing the opening and provided with a first cover pivotally provided in the apparatus main body, and a second cover pivotally provided on the first cover, and an image reading device provided above the opening for reading the image of an original, and when the first cover is pivotally moved in a direction to open the opening relative to the apparatus main body, the second cover is pivotally moved to the opening side relative to the first cover, and when the openable and closable cover has opened the opening, the openable and closable cover maintains a state in which it has opened the opening.

Also, the image forming apparatus has an apparatus main body provided with an image forming portion for forming an image, an opening formed in the apparatus main body and communicating with the interior of the apparatus main body, an openable and closable cover for opening and closing the opening and provided with a first cover pivotally provided in the apparatus main body and a second cover pivotably provided on the first cover, and an image reading apparatus provided above the opening for reading the image of an original, and the image reading device is rotatably provided in the apparatus main body so as to be capable of opening the upper part of the opening, the rotation direction of the image reading device and the direction of pivotal movement of the first cover being the same, and when the first cover is pivotally moved in a direction to open the opening relative to the apparatus main body, the second cover is pivotally moved to the apparatus main body side relative to the first cover.

DETAILED DESCRIPTION OF THE PREFERRED EMBODIMENTS

A color multi-function printer apparatus (hereinafter referred to as the "color MFP apparatus") as an image forming apparatus according to an embodiment of the present invention will hereinafter be described with reference to the drawings. Image forming apparatuses include a copying machine, a facsimile apparatus, a printer and a compound machine of these, and the image forming apparatus of the present invention is not restricted to a printer.

(Color MFP Apparatus)

The color MFP as an image forming apparatus will hereinafter be described with reference to FIGS. 1 to 7. The color MFP apparatus 101 is adapted to be used from the right side of FIG. 1 by a user. The color MFP apparatus 101 is provided with an image forming apparatus main body (hereinafter referred to as the apparatus main body) 104, an automatic original feeder 161 and an image reading device 103 for reading the image of an original. The apparatus main body 104 is a laser beam printer.

Figure 3:
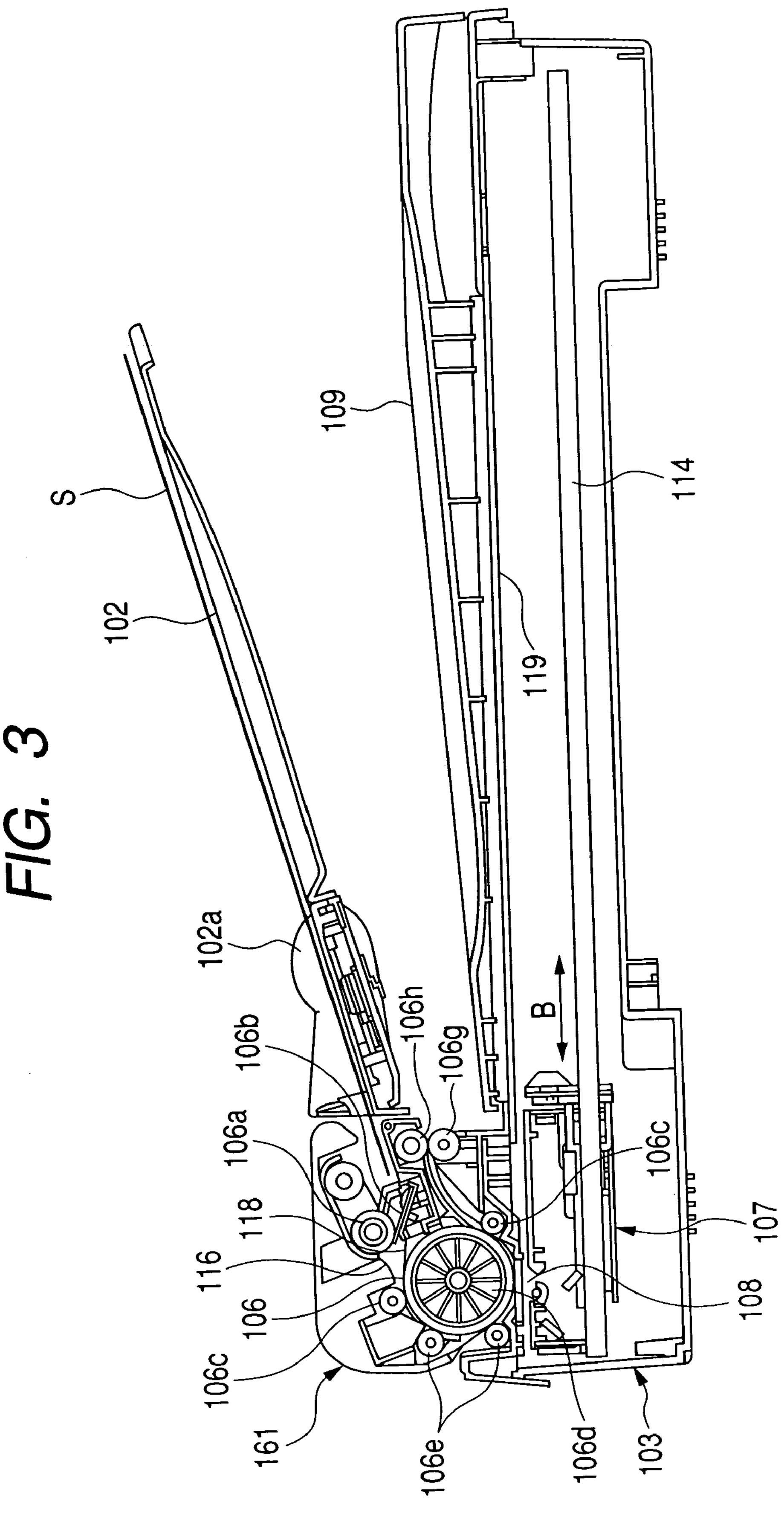
FIG. 3 is a front cross-sectional view of the image reading portion of the color MFP apparatus.
Figure 4:
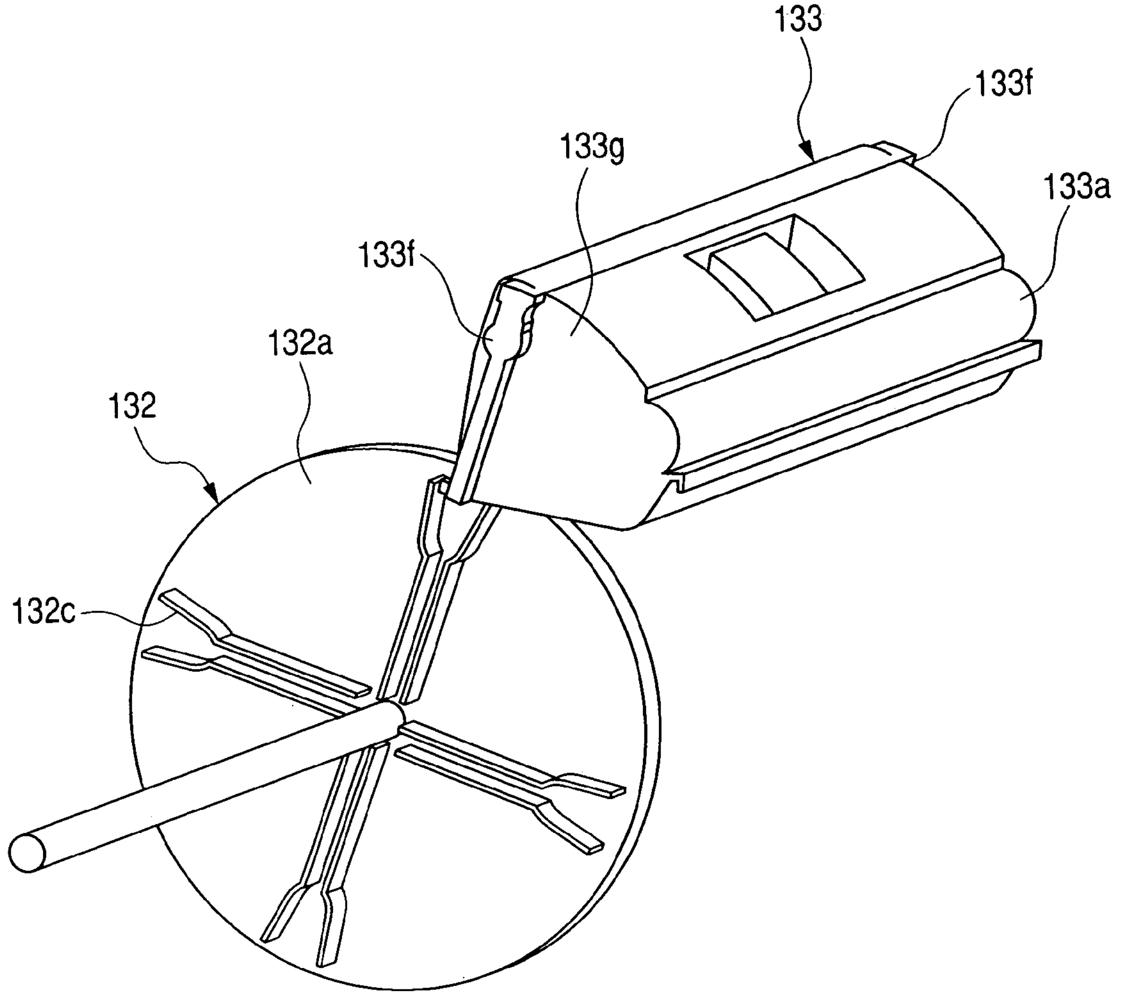
FIG. 4 is a perspective view showing the guide mechanism of a developing cartridge.

In FIG. 3, the automatic original feeder 161 is adapted to automatically successively feed originals S stacked on an original stacking plate 102 to the image reading device 103, and discharge the originals from which original information has been read by the image reading device 103 to the upper surface (back) of a pressure plate 109. The pressure plate 109 is adapted to urge a sheet original or a book original placed on an original plate 119 against the original plate 119. The pressure plate 109 is provided in the image reading device 103 for pivotal movement about a pressure plate shaft 109*a*. The supporting portion 109*b* of the pressure plate 109 is fitted in a hole in the image reading device 103. The pressure plate 109 is detachably mountable on the image reading device 103. That is, the supporting portion 109*b* of the pressure plate 109 can be taken out from and put into the hole in the image reading device.

The automatic original feeder 161 has a U-turn conveying roller 106*d* which will be described later. The automatic original feeder 161 is adapted to be rearwardly rotated relative to the image reading device 103 (in a direction indicated by the arrow A in FIGS. 1 and 2) to thereby open the original plate 119. When the automatic original feeder 161 is rotated, the pressure plate 109 exposes the upper surface of the original plate 119 to thereby enable the sheet original or the book original to be placed on the original plate 119. When the automatic original feeder 161 is returned to its original position, the pressure plate 109 urges the sheet original or the book original placed on the original plate 119 against the original plate 119.

The image reading device 103 shown in FIG. 3 can lead an original fed in by the automatic original feeder 161 by the reduction optical system reading portion 108 of a scanner 107. Also, the image reading device 103 can read the sheet original or the book original placed on the original plate 119 by the movement of the scanner 107 in the direction indicated by the arrow B. The scanner 107 is reciprocally moved with a guide shaft 114 as a guide. The image reading device 103 has an operating portion 105. The operating portion 105 is provided with a display portion for controlling the entire color MFP apparatus 100, an input key, etc.

Figure 5:
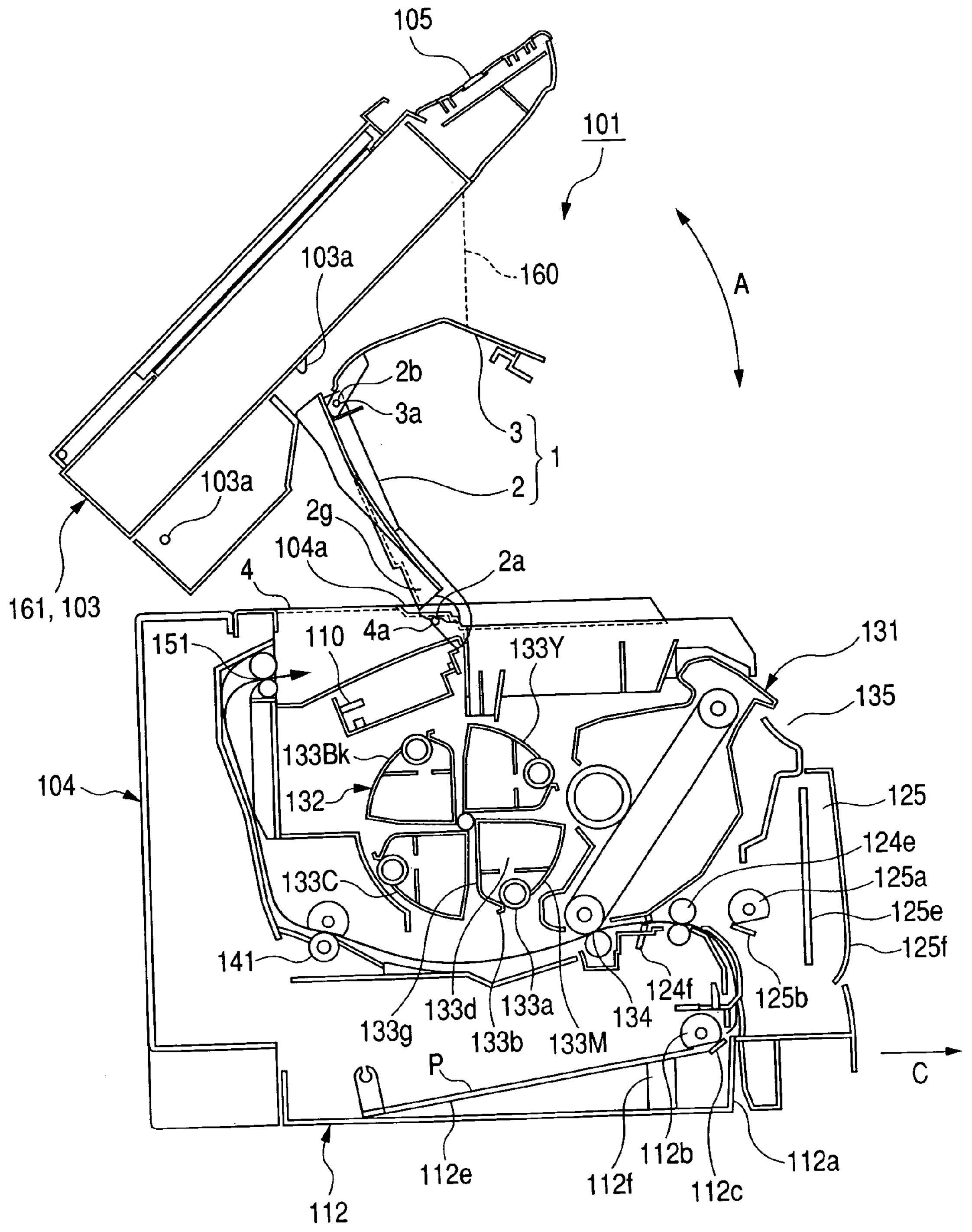
FIG. 5 is a cross-sectional view in which the image reading portion and a cartridge cover are opened in the color MFP apparatus of FIG. 1.

The image reading device 103, as shown in FIG. 5, is rotated in the direction indicated by the arrow A about a reading device shaft 103*a*, integrally with the automatic original feeder 161, by the user. The purpose of rotating the image reading device 103 is to effect the maintenance of the apparatus main body 104 such as interchanging, for example, a process cartridge 131 or a developing cartridge 133 containing a toner therein as a toner cartridge with a new cartridge.

The apparatus main body 104 is provided with a laser scanner 110, an image forming portion 111, a cassette sheet supplying portion 112, an upper sheet discharging portion 113, a cartridge cover 1 as an openable and closable cover, a multi-paper (MP) feeding portion 125, etc. The laser scanner 110 is adapted to apply a laser beam to an image bearing member 131*a* corresponding to each color, on the basis of image information read by the image reading device 103, or image information sent from the outside. The image bearing member 131*a* is provided in the process cartridge 131 and is detachably mountable with respect to the apparatus main body.

The image forming portion 111 forms an image on a sheet fed from the cassette sheet supplying portion 112. The image forming portion 111 is constituted by a developing cartridge 133, a process cartridge 131, a secondary transferring portion 134, etc. The image bearing member 131*a* is developed with a toner of each color contained in the developing cartridge 133 on the basis of the laser beam from the laser scanner 110. The cassette sheet supplying portion 112 is adapted to feed the sheets contained therein one by one to a pair of ante-transfer rollers 124*e*. The upper sheet discharging portion 113 is used in common with the upper cover of the apparatus main body 104 and the cartridge cover 1, and is adapted to stack a plurality of sheets P thereon.

In FIG. 3, the original conveying portion 106 of the automatic original feeder 161 separates the originals S stacked on the original stacking plate 102 one by one by a separating pad 106*a* and a separating roller 106*b* with which this separating pad 106*a* is brought into pressure contact. Then, the separated original is conveyed to a U-turn sheet path constituted by a portion of an outer original guide 116 and a portion of an inner original guide 118, by conveying runner 106*c* pressed by a pressure spring (not shown), and a U-turn conveying roller 106*d* with which the conveying roller 106*c* is brought into pressure contact. Further, the original conveying portion 106 conveys the original to the reduction optical system reading portion 108 of the image reading device 103 by a sheet feeding runner 106*e* pressed by a pressure spring (not shown), and a U-turn conveying roller 106*d* with which this sheet feeding runner 106*e* is brought into pressure contact.

The original S is pressed against the reading position of the reduction optical system reading portion 108 by the resilient force of the original pressing plate of an original pressing portion (not shown), and the image information of the original S is read by the image reading device 103. Thereafter, the automatic original feeder 161 discharges the original S onto the pressure plate 109 by a sheet discharging runner 106*g* pressed by a pressure spring, and a sheet discharging roller 106*h* with which this sheet discharging runner 106*g* is brought into pressure contact. In the meantime, the original S is guided by the outer original guide 116 and the inner original guide 118.

On the original stacking plate 102, there are provided a pair of sliders 102*a* (in FIG. 3, looking like one by overlapping) slidable in a direction (the width direction of the original S) perpendicular to the conveying direction of the original S. The pair of sliders 102*a* are moved toward and away from each other by the user, and can be moved toward each other to thereby true up the opposite side edges of the originals S stacked on the original stacking plate 102.

In the image reading device 103, the reduction optical system reading portion 108 is a portion which applies irradiating light from an LED array as a light source provided in the scanner 107 to the image information surface of the original S. The image reading device 103 reduces reflected light reflected from the image information surface by a mirror and a lens and images it on a CCD, and reads the image information of the original.

The scanner 107 of the image reading device 103 can also be moved under the original plate 119 by a driving motor (not shown) with the guide shaft 114 as a guide to thereby read the original S placed on the original plate 119. The original placed on the original plate 119 is urged against the original plate 119 by the pressure plate 109, whereby it is prevented from floating.

Figure 1:
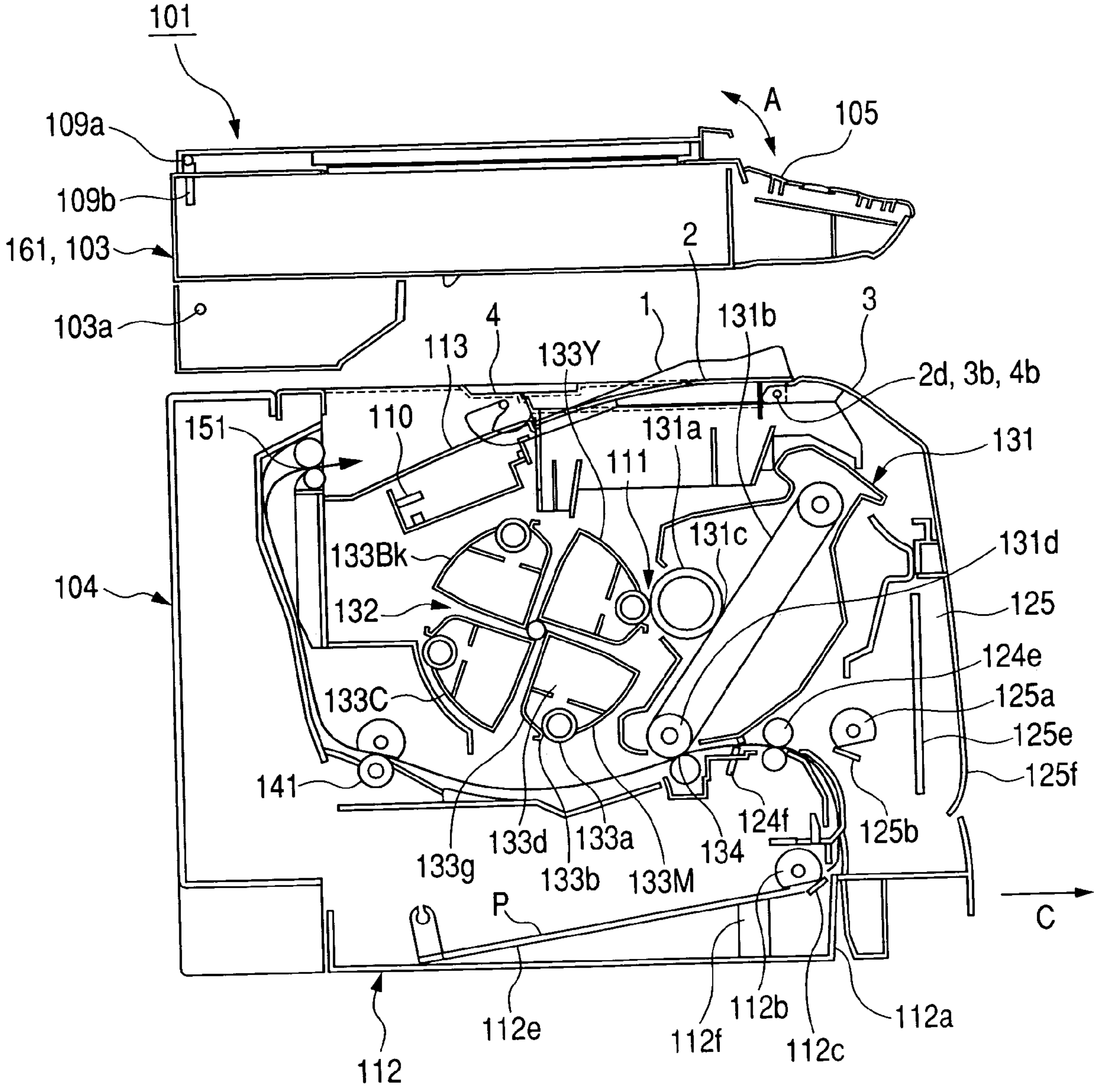
FIG. 1 is a cross-sectional side view of a color MFP apparatus according to an embodiment of the present invention in which a printer portion is broken away.
Figure 2:
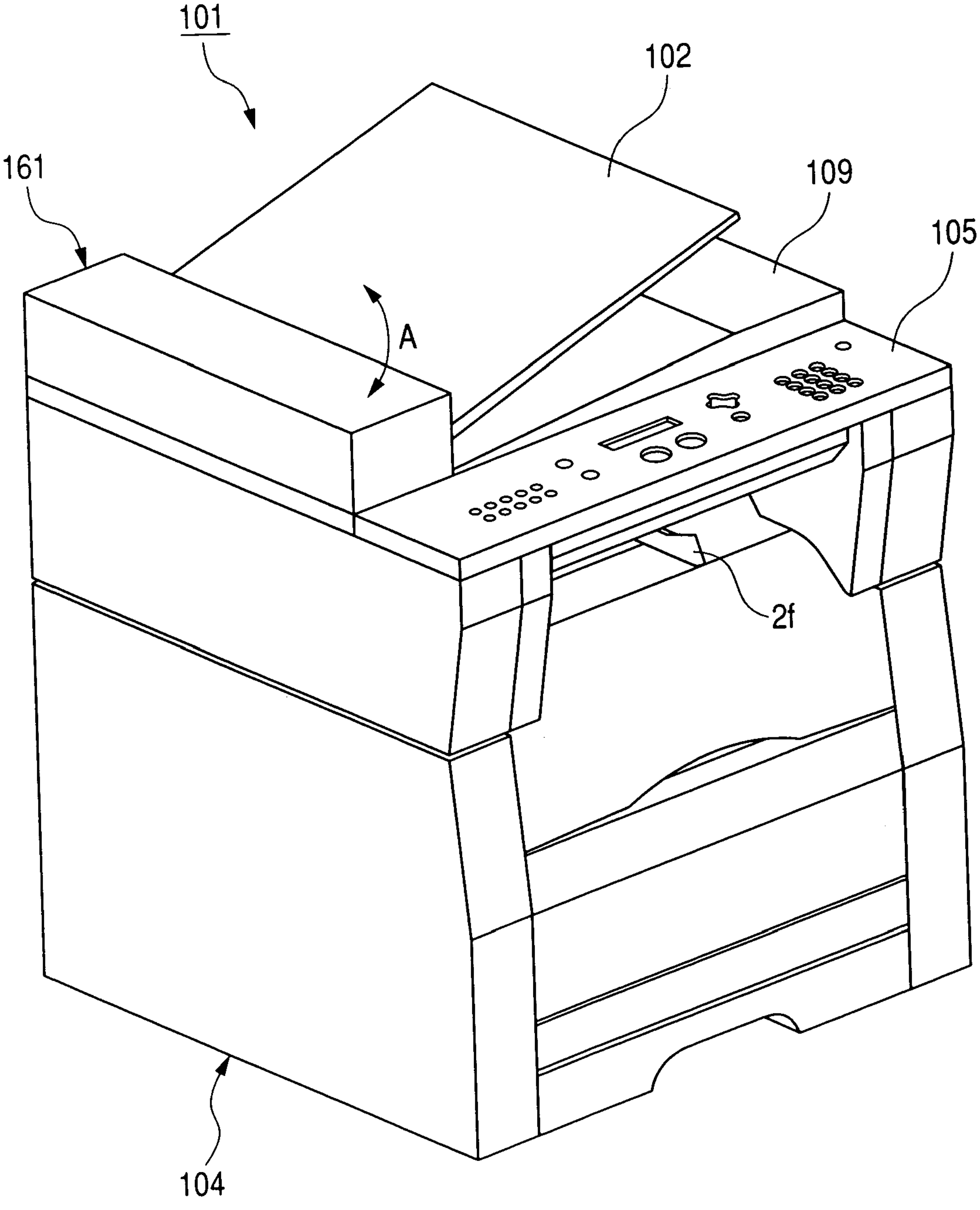
FIG. 2 is a perspective view of the color MFP apparatus.

As shown in FIG. 1, the cassette sheet supplying portion 112 is disposed on the bottom of the apparatus main body 104. Sheets are stacked on the inner plate 112*e* of a sheet supplying cassette 112*a*. The inner plate 112*e* is upwardly pushed by a inner plate spring 112*f*. Accordingly, the sheets are brought into pressure contact with a semicircular sheet feeding roller 112*b* by the inner plate 112*e*, and are separated one by one by the rotation of the sheet feeding roller 112*b* and the friction of a separating pad 112*c* (a frictional piece separating process), and is fed out from the sheet supplying cassette 112*a*.

The thus separated sheet P has its leading edge detected by a top sensor 124*f* after a predetermined time. If the top sensor 124*f* does not detect the leading edge of the sheet P within a predetermined time after the supply of the sheet has been started, a controlling portion (not shown) judges it as jam, and causes the operating portion 105 to display an indication that sheet jam has occurred.

A latent image is formed on an image bearing member (photosensitive drum) 131*a* which is a drum-shaped photosensitive member provided in the process cartridge 131 by the laser scanner 110. This latent image is toner-developed by the developing cartridge 133 rotatively moved to a developing position opposed to the image bearing member 131*a* by the rotation of a revolving drum 132 which is a rotation type developing cartridge changeover mechanism, and becomes a toner image. The toner image on the image bearing member 131*a* is transferred onto an intermediate transfer belt 131*b* in a primary transferring portion 131*c*.

The intermediate transfer belt 131*b* is circulated by a driving roller 131*d* in the process cartridge 131. The driving roller 131*d* is rotated by the drive source of the apparatus main body 104. The latent image forming step, the latent image developing step and the primary transferring step are subsequently repeated with respect to respective developing cartridges 133Y, 133M, 133C and 133Bk. Thereby, multicolor images are formed on the intermediate transfer belt 131*b*. Thus, in a secondary transferring portion 134, the toner images on the intermediate transfer belt 131*b* are transferred to the sheet P sent from the cassette sheet supplying portion 112. At this time, the sheet is fed into the secondary transferring portion 134 at a timing conforming to the position of the toner images by the pair of ante-transfer rollers 124*e* so that the toner images may be transferred to a predetermined position.

The yellow, magenta, cyan and black developing cartridges 133Y, 133M, 133C and 133Bk will now be described with reference to FIGS. 1 to 7. The constructions of the developing cartridges of the respective colors are the same and therefore, the reference numeral "133" is used for them.

The developing cartridge 133 is constituted by a developing sleeve 133*a* which is a developer carrying member, a developing blade 133*b*, a developer containing portion 133*d*, a cartridge frame 133*g*, etc. The developing sleeve 133*a* is rotated by the drive source of the apparatus main body 104. The opposite end portions of the developing cartridge 133 are fixed to a revolving drum 132 by projections 133*f*. The projections 133*f* are provided so as to outwardly protrude from the cartridge frame 133*g* of the developing cartridge 133. Also, a drive connecting member (not shown) detachably engaged with the drive connecting member of the apparatus main body 104, and a contact portion (not shown) for applying a developing bias from the high voltage source of the apparatus main body 104 to the developing sleeve 133*a* are provided on the longitudinal end surfaces of the cartridge frame 133*g* of the developing cartridge 133.

The revolving drum 132 is rotated while holding the developing cartridge 133. The revolving drum 132 has the side plates 132*a* of a disk, a driving side side plate (not shown), and mounting portions 132*c* for the developing cartridge 133 at four locations at equal intervals circumferentially of the two side plates 132*a*, and is rotatably provided in the apparatus main body 104. Also, flags (not shown) corresponding to the colors of the respective toners contained in the containing portion of the developing cartridge 133 are provided on the sides of the side plates 132*a* of the developing cartridge 133. These flags (not shown) are adapted to cross a photosensor (not shown) provided in the apparatus main body by the revolution of the revolving drum 132. This photosensor is a revolutions sensor for detecting the revolved position of the revolving drum 132. A gear is formed on the outer periphery of the revolving drum 132. The revolving drum 132 is rotated by a developing motor (not shown), and the developing sleeve 133*a* of each of the developing cartridges 133Y, 133M, 133C and 133Bk is stopped at a developing position opposed to the image bearing member 131*a*.

Further, the sheet P has its image information fixed by a fixing portion 141, and is discharged to the upper sheet discharging portion 113 by sheet discharging rollers 151. The sheet P has its side edge regulated by a sheet regulating plate (not shown) movably mounted in accordance with the sheet size so that a skew feed or a misfeed may not occur. The image is recorded on the underside of the sheets P stacked on the sheet supplying cassette 112*a*.

Also, the presence or absence of the sheet P is detected by a cassette sensor (not shown). The number of sheets stackable on the cassette 112*a* is about 250 sheets. The cassette 112*a* is adapted to be drawn out in a forward direction (the direction indicated by the arrow C in FIG. 1) relative to the apparatus main body 104 (a front loading type). Also, the stackable sheet sizes are five kinds, i.e., A4, A5, B5, letter and legal.

Also, the present color MFP apparatus 101 has a multipaper (MP) feeding portion 125 on the front face of the apparatus main body 104. The MP feeding portion 125 has an openable and closable MP tray 125*f*. The MP tray 125*f* serves also as a front cover. The MP tray 125*f* is provided with an MP extension tray 125*e* for supporting a sheet whose trailing edge protrudes from the MP tray **125*f*** so as to be drawn out. An MP inner plate (not shown) is upwardly biased by an MP inner plate spring (not shown), but is adapted to be depressed into a standby state by a cam (not shown) so that the sheets P may be stacked thereon.

When a signal for starting the MP feeding is produced from the controlling portion (not shown) of the color MFP apparatus 101, the cam (not shown) is pivotally moved and the depressed state of the MP inner plate (not shown) is released. The sheets P stacked on the MP inner plate are fed out from the MP inner plate by a semicircular MP feeding roller **125*a* and also, are separated one by one while being sandwiched between the MP feeding roller 125*a* and an MP separating pad 125*b* (a friction piece separating type) and are conveyed. The thus separated sheet P continues to be pressure-conveyed by the MP feeding roller 125*a* and the MP separating pad 125*b*, and is delivered to the pair of ante-transfer rollers 124*e***.

If the top sensor **124*f* does not detect the leading edge of the sheet P within a predetermined time after the sheet supply has been started, the controlling portion (not shown) determines that jam has occurred to the sheet. The controlling portion which has thus determined that a jam has occurred stops the sheet conveying operation of the color MFP apparatus 101, and also displays an indication of the occurrence of a sheet jam on the operating portion 105**.

Further, the sheet P continues to be conveyed still after it has arrived at the pair of ante-transfer rollers **124*e*, and has its leading edge position detected by the top sensor 124*f*. The sheet P having had its leading edge position thus detected is timed and conveyed to the secondary transferring portion 134 so that the toner images formed on the intermediate transfer belt 131*b*** can be transferred to a predetermined position on the sheet.

The MP feeding portion 125 is not provided with a registration mechanism. Therefore, the sheet P has its side edge regulated by a sheet regulating plate (not shown) movably mounted in accordance with the sheet size so that skew feed or misfeed may not occur. The image is recorded on the upper surface of the sheets being stacked on the MP tray **125*f*** or the sheets P stacked thereon.

The presence or absence of the sheets P is detected by an MP sensor (not shown) The number of sheets stackable on the MP feeding portion 125 is about 100 sheets. The present color MFP apparatus 101 is provided with the MP feeding portion 125, whereby it is possible to add postcards and business cards to the suppliable sheet sizes.

Also, the cassette sheet supplying portion 112 and a second stage cassette sheet supplying portion (not shown) similar in structure to the cassette sheet supplying portion 112 are adapted to be capable of being separated from or coupled to each other as an option. The number of sheets stackable on the entire apparatus can be changed from about 250 sheets to about 600 sheets.

(Cartridge Cover of the Color MFP Apparatus)

Figure 7:
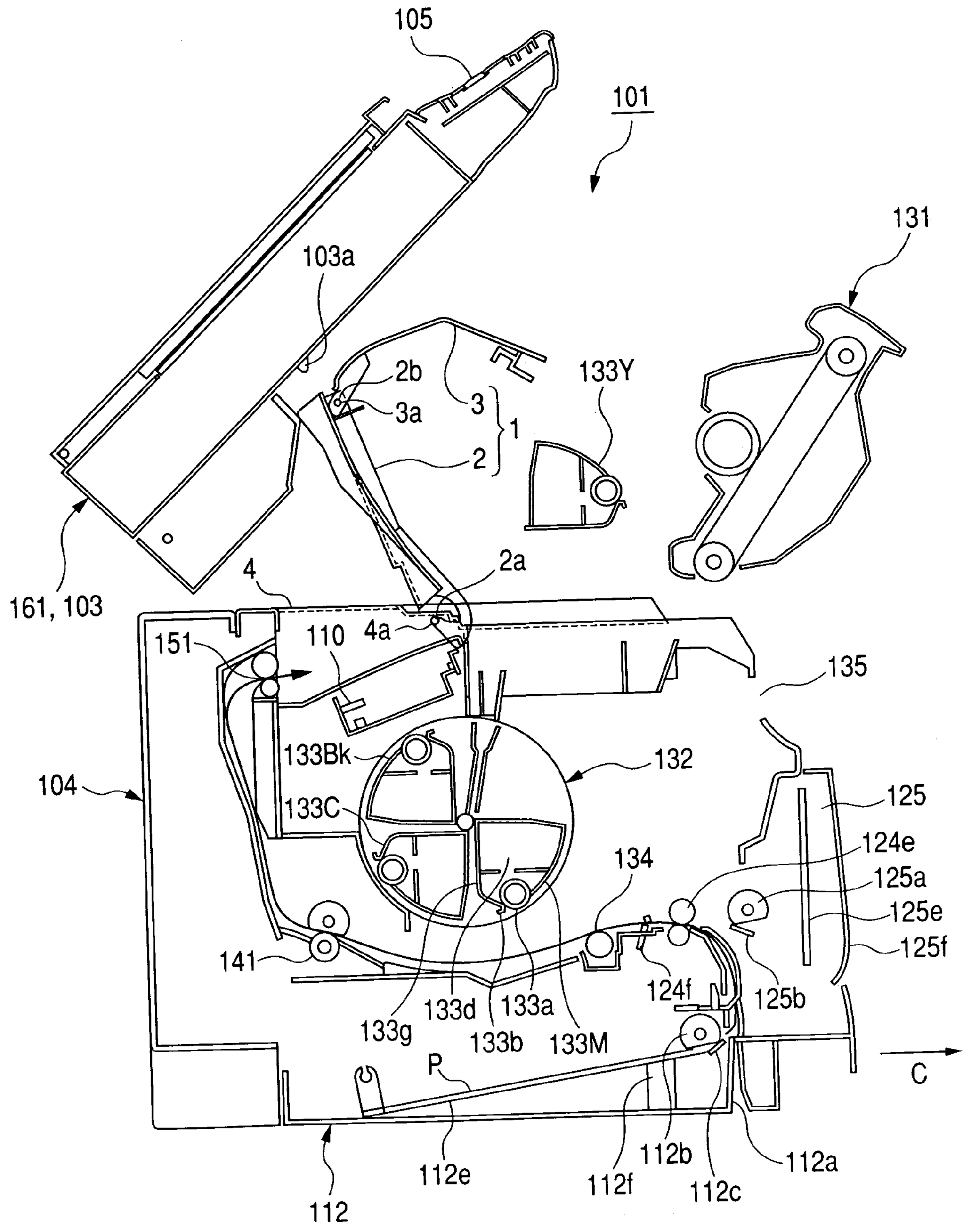
FIG. 7 is a cross-sectional view showing a state in which the cartridge cover has been opened and a process cartridge has been taken out from an apparatus main body.

As shown in FIG. 7, the process cartridge 131 and the developing cartridge 133 are adapted to be capable of being taken out from the mounting and dismounting port 135 of the apparatus main body 104 when the cartridge cover 1 is opened. The mounting and dismounting port 135 is the opening of the present invention formed in the apparatus main body 104.

Figure 6:
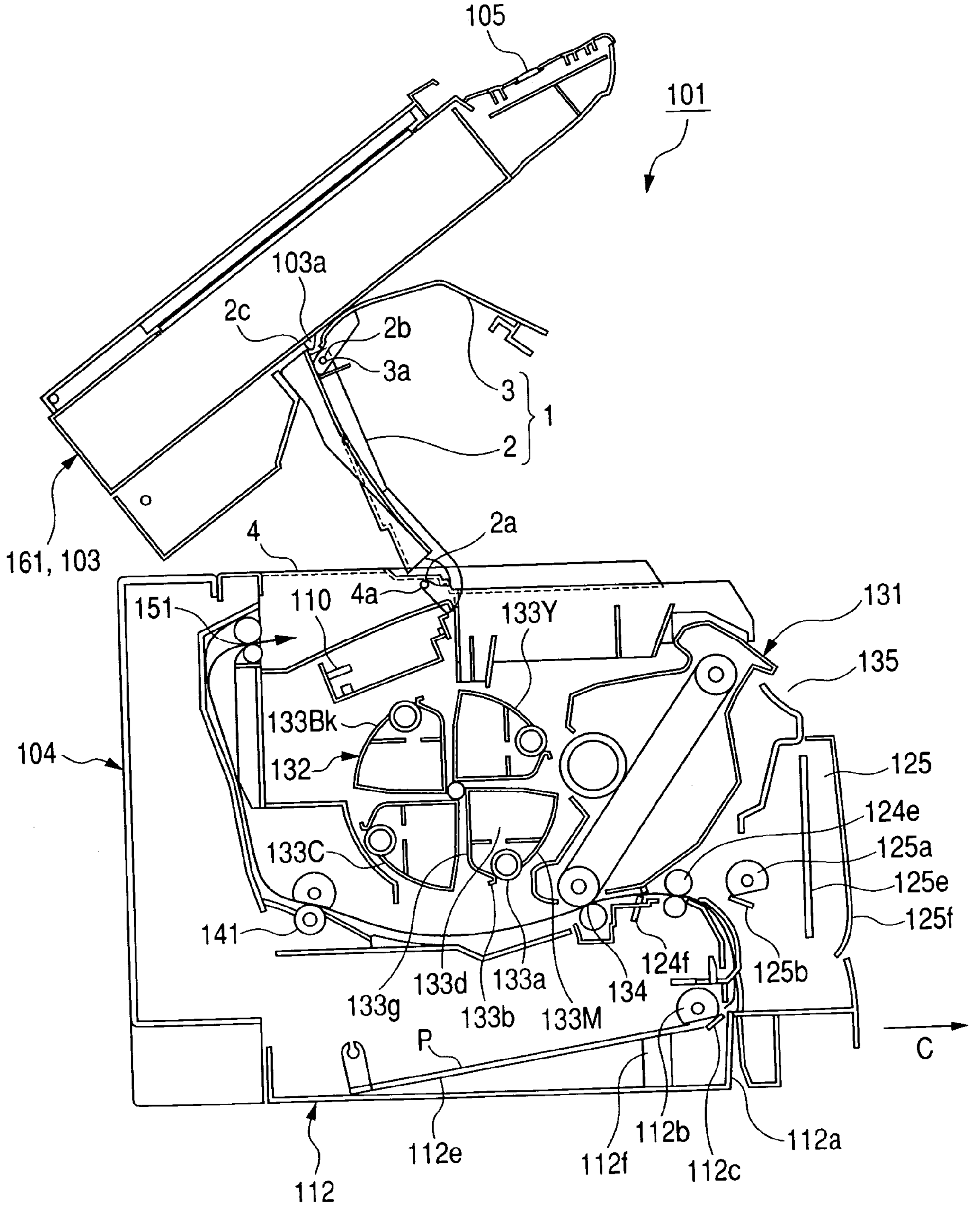
FIG. 6 is a cross-sectional view showing a state in which the image reading portion and the cartridge cover are opened in the color MFP apparatus of FIG. 1, and the cartridge cover is caught by a stopper.
Figure 8:
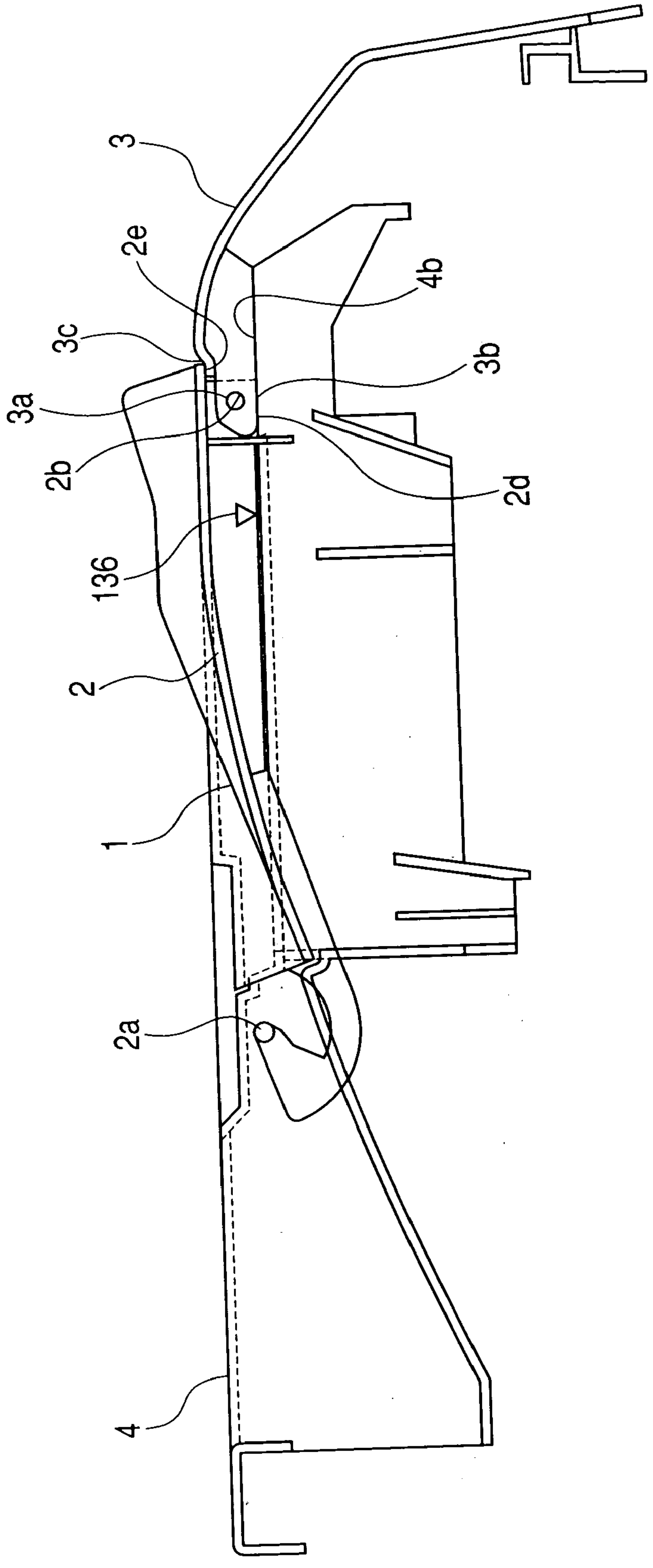
FIG. 8 is a cross-sectional view showing a state in which the cartridge cover has closed a mounting and dismounting port.
Figure 9:
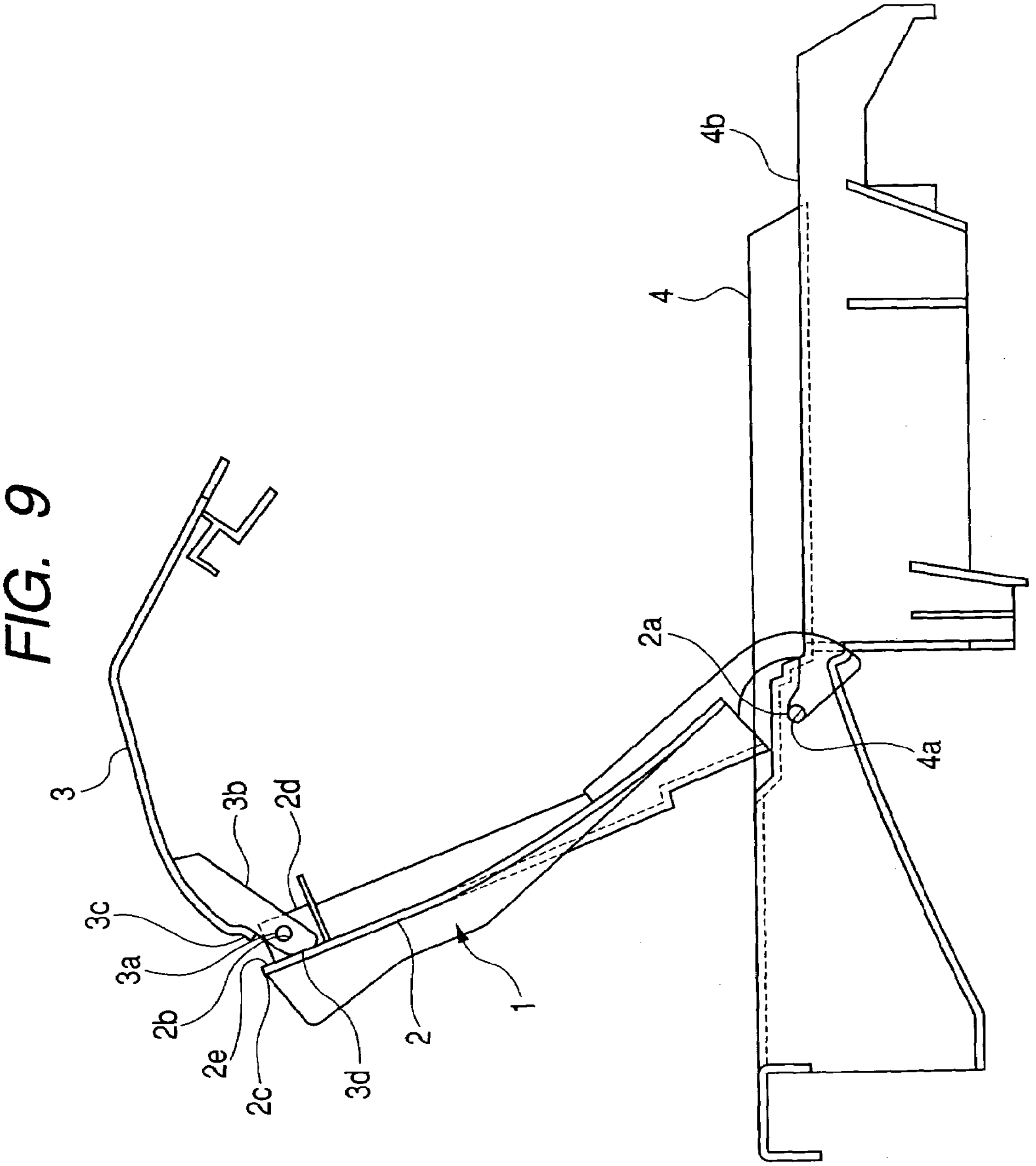
FIG. 9 is a cross-sectional view showing a state in which the cartridge cover has opened the mounting and dismounting port.

FIG. 1 is a cross-sectional view of the color MFP apparatus 101 with the cartridge cover 1 closed. FIGS. 5 to 7 are cross-sectional views of the color MFP apparatus 101 when the cartridge cover 1 is opened. The cartridge cover 1 as an openable and closable cover has a first cover 2 and a second cover 3 as cover members. FIG. 8 is a cross-sectional view of the cartridge cover 1 in a state in which the cartridge cover 1 has closed the mounting and dismounting port. FIG. 9 is a cross-sectional view of the cartridge cover 1 in a state in which the cartridge cover 1 has opened the mounting and dismounting port.

The first cover 2 is provided so as to be pivotally movable by about 90 degrees or greater relative to the apparatus main body 104, by a shaft **2*a* provided on one end side of the first cover 2, and a bearing portion 4*a* provided on a top cover 4 which is the upper cover of the apparatus main body 104. The mounting and dismounting port 135 can be opened by the first cover 2 being pivotally moved. Also, a bearing portion 2*b* is provided on the other end of the first cover 2. The second cover 3 has a shaft 3*a* on the first cover 2 side. The bearing portion 2*b* provided on the first cover 2 pivotally holds the shaft 3*a* provided on the second cover 3. That is, the second cover 3 is supported for pivotal movement about the shaft 3*a* relative to the first cover 2. When the first cover 2 is pivotally moved relative to the apparatus main body 104 in a direction to open the mounting and dismounting port, the second cover 3 is pivotally moved to the apparatus main body 104 side relative to the first cover 2**.

The joint portions **2*e* and 3*c* of the first cover 2 and the second cover 3 overlap each other. The joint portions 2*e* and 3*c* are joined together, whereby the first and second covers become incapable of being pivotally moved in an opening direction. That is, the cartridge cover 1 is adapted to bend only inwardly. The joint portions 2*e* and 3*c* are stoppers for preventing the second cover 3 from being pivotally moved to the opposite side from the apparatus main body 104 relative to the first cover 2. That is, the joint portions 2*e* and 3*c* serve as stoppers for preventing the cartridge cover 1 from assuming a shape along the mounting and dismounting port 135 when the cartridge cover 1 has closed the mounting and dismounting port 135, and bending in a direction away from the mounting and dismounting port 135**.

Also, the joint portions **2*e* and 3*c* of the first cover 2 and the second cover 3 are made to overlap each other, whereby even when the laser beam is reflected by a foreign substance or the like and travels toward the outside of the apparatus, the laser beam does not leak to the outside of the apparatus. Also, the cartridge cover 1 is adapted to close the mounting and dismounting port 135 while assuming a shape along the mounting and dismounting port 135 and therefore, the mounting and dismounting port 135 can be easily closed by the gravity of the cartridge cover 1**.

Figure 10:
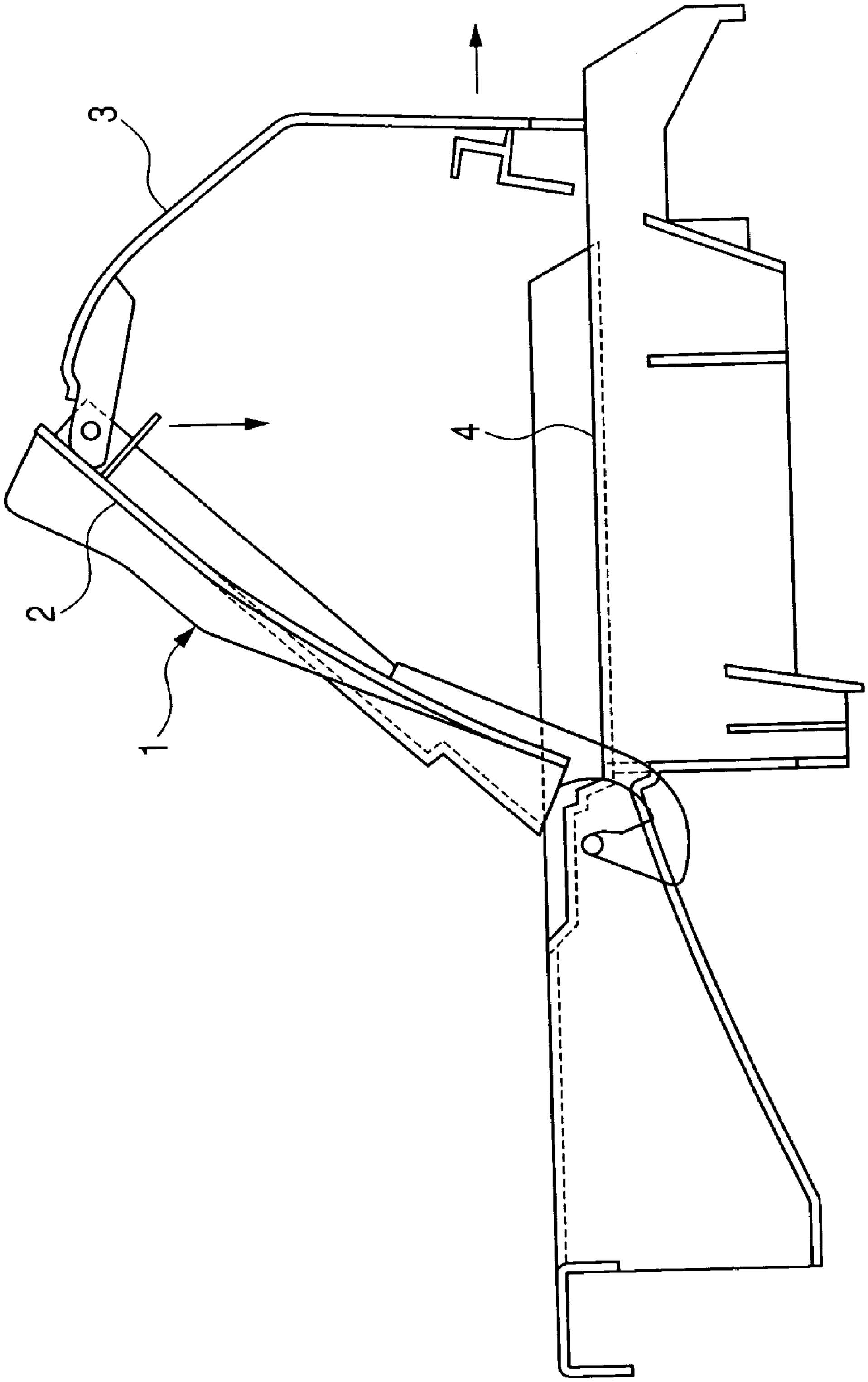
FIG. 10 is a view showing a state in which the second cover of the cartridge cover contacts a top cover and the cartridge cover is inwardly bent.

Also, the cartridge cover 1 has its range of pivotal movement regulated by the second cover stopper **3*d* of the second cover 3 abutting against the first cover 2 in a closing direction as well (see FIG. 9). When the cartridge cover 1 is opening the mounting and dismounting port (the state shown in FIG. 9), the angle of the second cover 3 with respect to the first cover 2 is kept at a predetermined angle. When the cartridge cover 1 is closed from its opened state, the angle of the second cover 3 with respect to the first cover 2 does not become smaller than the predetermined angle (see FIG. 10**).

As shown in FIG. 5, the image reading device 103 is rotatably provided in the apparatus main body 104 so that the upper part of the mounting and dismounting port can be opened. The direction of rotation of the image reading device 103 and the direction of pivotal movement of the first cover 2 are the same. A stopper receiver **103*a* is provided in the lower portion of the image reading device 103. As shown in FIG. 6, the design is such that when an attempt is made to close the image reading device 103 in a state in which the cartridge cover 1 opens the mounting and dismounting port 135, the stopper receiver 103***a* is engaged by the stopper (engaging portion) 2*c* of the first cover 2 and the image reading device 103 cannot be singly closed. Therefore, a hand or a thing can be prevented from being nipped between the second cover 3 and the top cover 4. The stopper 2*c* of the first cover 2 is a stopper which hinders the image reading device 103 from being closed in a state in which the image reading device 103 and the cartridge cover 1 are opened. The stopper 2*c* restrains a rotation of the image reading device 103 in a direction to be closed in a state that the cartridge cover 1 is opened.

The upper surface of the top cover 4, particularly the surroundings of the mounting and dismounting port 135, and particularly the distal end of the second cover 3 are smoothly formed with respect to the closing direction of the second cover 3. When the distal ends of the top cover 4 and the second cover 3 are made smooth, even if the hand is released while the cartridge cover 1, as shown, for example, in FIG. 5, is brought down to the right side and closed in a state in which it is bent into a dog-legged shape, the cartridge cover 1 slides on the top cover 4 by its own weight. Consequently, the cartridge cover 1 slides on the upper surface of the top cover 4, whereby the mounting and dismounting port 135 can be closed easily and reliably. At this time, the locking of the second cover 3 relative to the apparatus main body 104 is set to such intensity as to be closed by the weight of the cartridge cover 1.

Near the shaft 3*a* provided in the second cover 3, abutting portions 2*d* and 3*b* (FIG. 8) are provided on the first cover 2 and the second cover 3, respectively. The abutting portions 2*d* and 3*b* are designed to contact with an opposed portion 4*b* on the top cover 4 in a state in which the cartridge cover 1 has closed the top cover 4. The joint portions 2*e* and 3*c* of the first cover 2 and the second cover 3, even if pressed from above in FIG. 8, are adapted to be received by the opposed portion 4*b*. Therefore, a force does not concentrate only on the second cover bearing portion 2*b* of the first cover 2 and the first cover side shaft 3*a* of the second cover 3. By such a construction, the damaging of the cartridge cover 1 is adapted to be prevented. Here, the covers are made to overlap each other so that the laser beam may not leak to the outside of the apparatus even if the laser beam happens to be reflected by a foreign substance or the like.

Also, it becomes unnecessary to provide each cover with an interlock switch 136 as a stop switch for preventing the malfunctioning when the cartridge cover 1 is opened. That is, the number of the interlock switches can be one, and it is possible to realize a cost equal to that when the cartridge cover 1 is constructed of a single member.

That is, only one interlock switch as a detecting sensor for detecting the opening and closing of the cartridge cover 1 is provided for all of the divided cover members. Thereby, it is possible to prevent an increase in cost which would otherwise be caused by dividing the cartridge cover 1 into a plurality of parts. In this case, the interlock switch is provided on the foremost one of the plurality of cover members, and the opening and closing of the cartridge cover 1 is detected on the basis of the position of the foremost cover member. When intermediate one of the plurality of cover members deviates from a normal operating position, it causes a deviation of a detecting position and therefore, the interlock switch does not detect the opened state of the cover. Such malfunctioning can be prevented. Also, the interlock switch is provided in the root portion of the first cover 2, whereby it can be disposed at a place most difficult to touch, and therefore, erroneous detection can be prevented. When the interlock switch is provided in the root portion of the first cover 2, the first cover cannot be outwardly bent and therefore the second cover 3 cannot be singly opened and thus, safety can be secured. Further, in order to secure the user's safety when the cartridge cover 1 is opened, the strength of the divided portion of the second cover 3, and the strength of a supporting portion journalled to make the pivotal movement of the second cover 3 possible are increased to thereby prevent the cartridge cover from being damaged during the ordinary use thereof. The interlock switch 136 produces a signal for detecting the opened state of the cartridge cover 1 when it is opened, and stopping the operation of the image forming portion 111.

The cartridge cover 1 is divided into a plurality of covers, i.e., the first cover 2 and the second cover 3, and the portion between the covers 2 and 3 is made inwardly bendable, whereby an opening and closing space above the apparatus main body 104 necessary for the opening and closing of the cartridge cover 1 can be made small. Particularly, the height of the opening and closing space can be made small.

As a result, when the color MFP apparatus 101 is used simply in the apparatus main body 104, the space necessary for the apparatus main body 104 can be made narrower than in the conventional art, and when the apparatus main body 104 is to be installed on a shelf, the shelf itself can be made low or the spacing between shelves can be made narrow.

Also, in a case where the automatic original feeder 161 and the image reading device 103 are provided above the apparatus main body 104, the image reading device 103 can be disposed in proximity to the apparatus main body 104. Accordingly, the color MFP apparatus 101 can be made compact in the height direction thereof.

Also, the automatic original feeder 161 and the image reading device 103 are provided for pivotal movement relative to the apparatus main body 104. As described above, the opening and closing space for the cartridge cover 1 may be narrow and therefore, the opening angles of the automatic original feeder 161 and the image reading device 103 can be made small. Accordingly, the opening and closing of the automatic original feeder 161 and the image reading device 103 can be done easily.

As described above, the opening angles of the automatic original feeder 161 and the image reading device 103 can be made small. Consequently, it never happens that when the automatic original feeder 161 and the image reading device 103 are rotated in the direction indicated by the arrow A in FIG. 1 to thereby separate the pressure plate 109 from the original plate 119 and the original plate 119 is opened, the hand does not reach the pressure plate 109.

Also, in order to simplify the mounting structure of the pressure plate 109 with respect to the automatic original feeder 161, the present embodiment is a form in which the pressure plate 109 is taken out from and put into the automatic original feeder 161. Here, as described above, the opening angles of the automatic original feeder 161 and the image reading device 103 can be made small and therefore, the pressure plate 109 can be prevented from falling off the automatic original feeder 161. That is, the design is made such that even when the image reading device has been pivotally moved with the pressure plate 109 opened, the image reading device 103 is not pivotally moved by a predetermined angle or greater so that the pressure plate 109 may not fall.

Also, the cartridge cover 1, as shown in FIG. 5, is held in a state in which it is bent into a dog-legged shape when the mounting and dismounting port 135 has been opened. The center of gravity G of the cartridge cover 1 is set at a position at which a projected piece 2*g* provided on the first cover 2 is received by a receiving portion 104*a* as a regulating member provided in the apparatus main body 104, and can maintain a bent state. When the cartridge cover 1 has opened the mounting and dismounting port, the cartridge cover 1 is maintained in the state in which it has opened the mounting and dismounting port by its own weight. Thereby, the work of interchanging the process cartridge 131 and the developing cartridge 133 can be effected easily while the cartridge cover 1 remains opened.

The second cover 3 is held so that the angle of pivotal movement of the second cover 3 relative to the first cover 2 in a state in which the first cover 2 has its pivotal movement regulated by the receiving portion 104*a* may be a predetermined angle. The predetermined angle is such an angle that the second cover 3 is not pivotally moved to the apparatus main body side relative to the first cover 2 when the cartridge cover 1 is closed from a state in which the pivotal movement of the first cover 2 is regulated.

A wire 160 as coupling means for opening the cartridge cover 1 in operative association with the image reading device 103 when the automatic original feeder 161 and the image reading device 103 have been opened as shown in FIG. 5 may be provided between the image reading device 103 and the cartridge cover 1. Owing to the wire 60, when the image reading device 103 has been opened, the cartridge cover 1 is also opened in operative association therewith and therefore, the interchange of the process cartridge 131 and the developing cartridge 133 can be effected easily. The coupling means for the cartridge cover 1 to be operatively associated with the pivotal movement of the image reading device 103 in a direction to open the upper part of the mounting and dismounting port is not restricted to the wire 160, but use may be made of a chain or a link mechanism.

Figure 11:
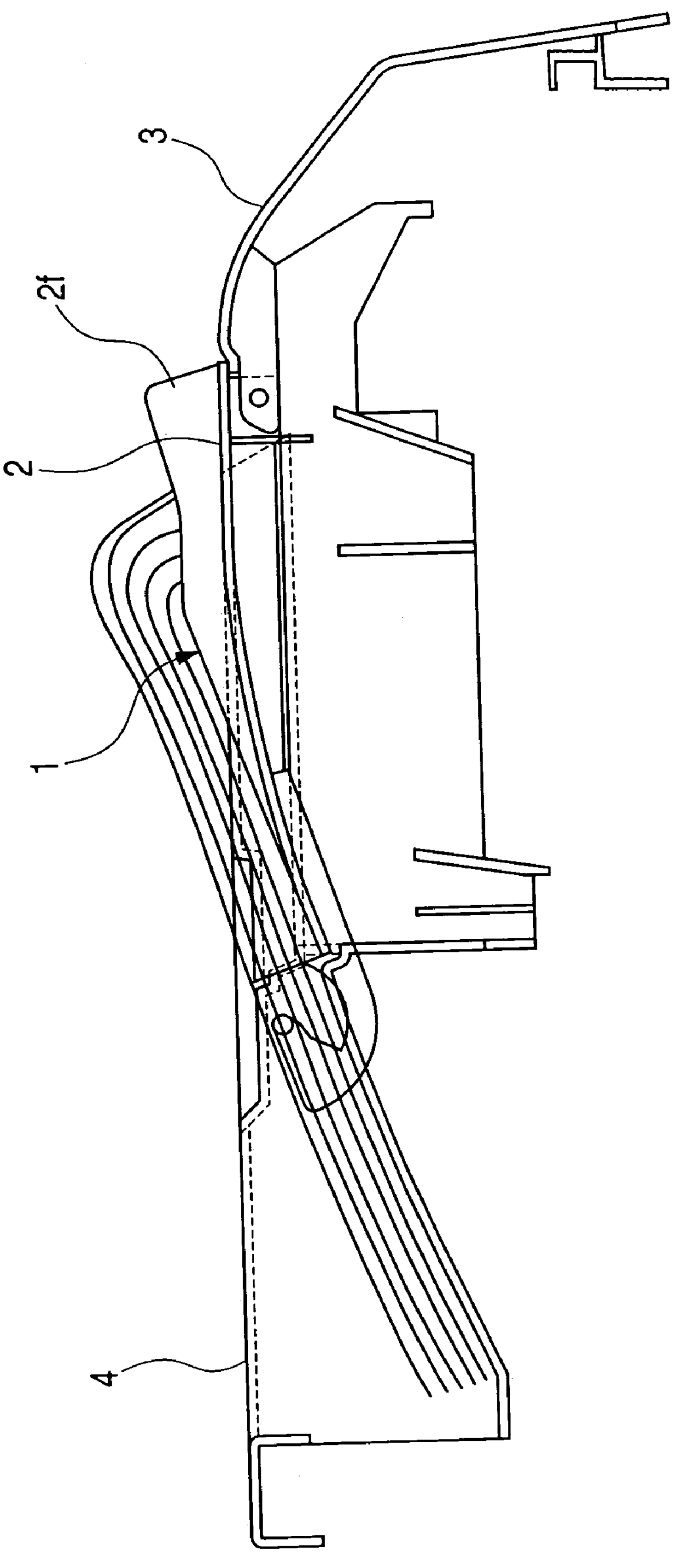
FIG. 11 is a view showing a state in which sheets are stacked on the rib of the cartridge cover.

Also, FIG. 11 is a cross-sectional view showing a state in which the cartridge cover 1 of the color MFP apparatus 101 according to the present embodiment is closed. The cartridge cover 1 is adapted to stack the sheets thereon. Also, if two ribs 2*f* formed into two stages only on the first cover 2 are provided inside a fixed size sheet width, when fixed size sheet (in the present embodiment, A4 and LTR) has been discharged, the fixed size sheet can be formed into a trough curl shape between the two ribs 2*f* to thereby enhance the stackability of the sheets. Also, in a case where a sheet having its leading edge, downwardly curled has been discharged, when it has passed the first stage projection, the leading edge can be held down by the second stage projection, and good stacking becomes possible.

Another embodiment of the present invention will hereinafter be described.

Figure 12:
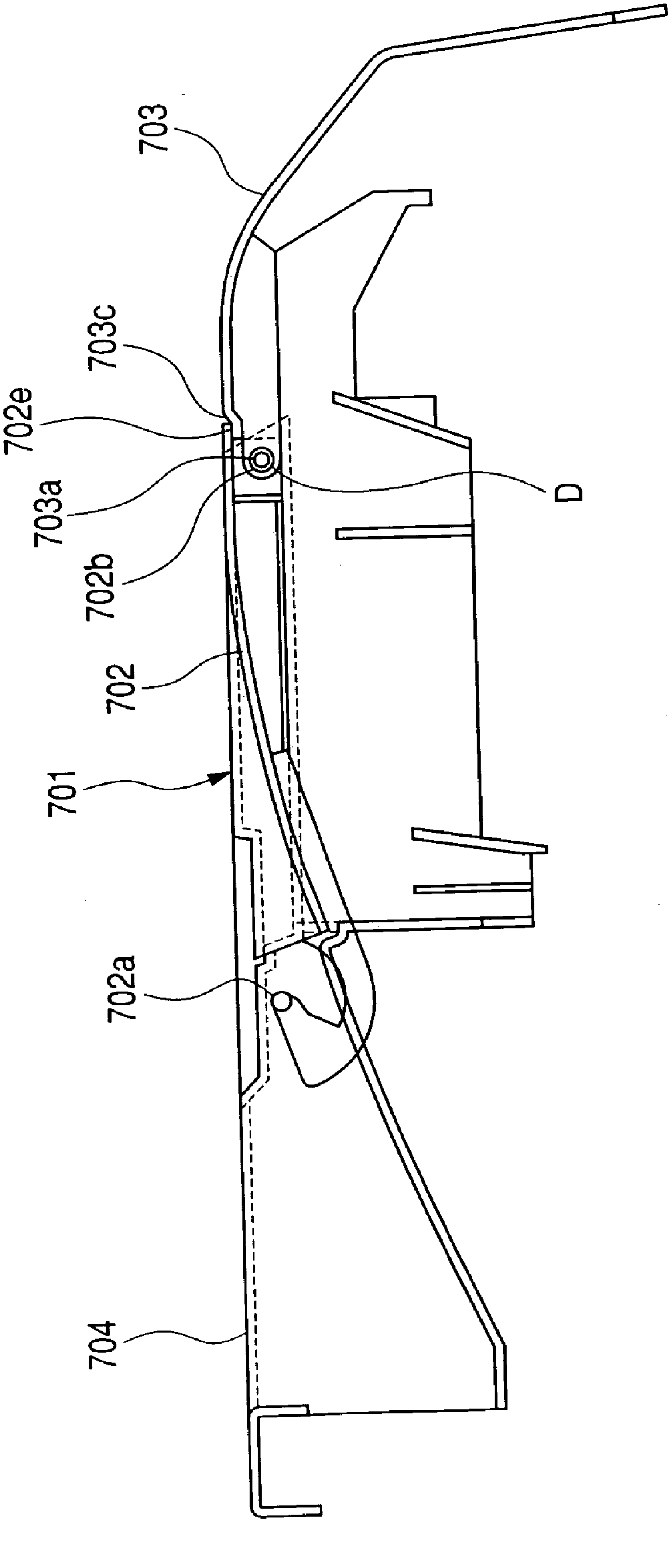
FIG. 12 is a cross-sectional view showing another embodiment.
Figure 13:
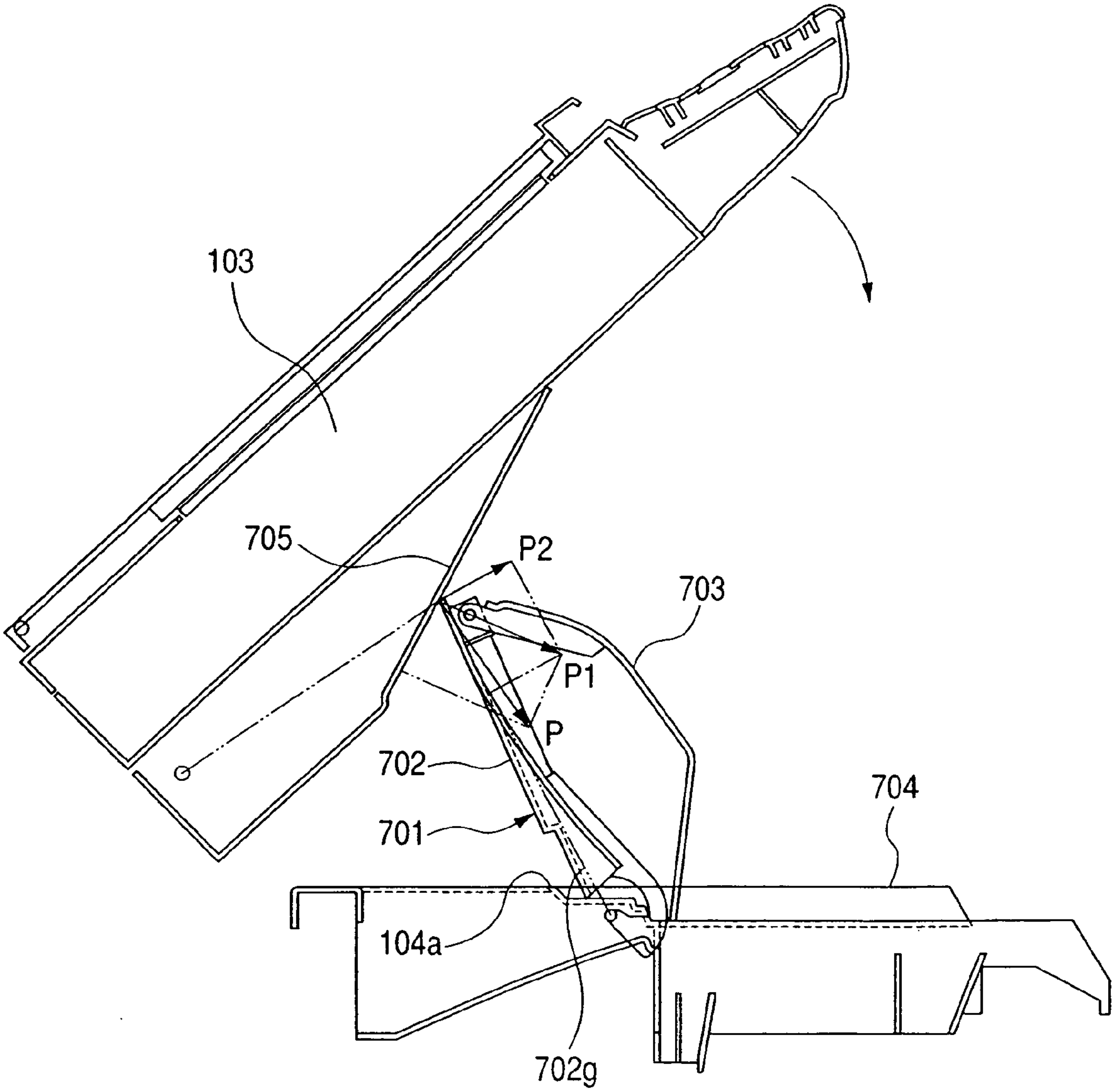
FIG. 13 is a cross-sectional view showing another embodiment.

FIG. 12 is a cross-sectional view showing a state in which the cartridge cover 701 of a color MFP apparatus according to the present embodiment is closed. FIG. 13 is a cross-sectional view showing a state in which the cartridge cover 701 of the color MFP apparatus according to the present embodiment is opened. The color MFP apparatus according to the present embodiment differs only in the construction of the cartridge cover from the color MFP apparatus 101 described above. The construction differing from that of the above-described color MFP apparatus 101 will hereinafter be described in detail, and the same construction need not be described.

Referring to FIGS. 12 and 13, the cartridge cover 701 as an openable and closable cover is constituted by a first cover 702 and a second cover 703. The first cover 702 has a shaft 702*a* provided on the image forming apparatus main body 104 side. A top cover 704 which is the upper cover of the image forming apparatus main body 104 is provided with a bearing portion 704*a* rotatably holding the shaft 702*a*. The first cover 702 is provided for pivotal movement relative to the image forming apparatus main body 104 by the bearing portion 704*a*. The first cover 702 can be opened by 90 degrees or greater. The first cover 702 has a bearing portion 702*b*. The second cover 703 has a shaft 703*a* on the first cover 702 side thereof. The second cover 703 is supported for pivotal movement about the shaft 703*a* relative to the first cover 702 by the bearing portion 702*b* of the first cover 702. That is, the first cover 702 pivotably holds the second cover 703.

The joint portions 702*e* and 703*c* of the first cover 702 and the second cover 703 overlap each other. The opening angle of the cartridge cover 701 is set to an angle at which the opened state thereof can be maintained by the weight of the first cover 702 and the second cover 703 when the cartridge cover 701 has been left in its opened state. A projected piece 702*g* provided on the first cover 702 is received by a receiving portion 104*a* as the regulating member of the apparatus main body 104, and the pivotal movement of the first cover 702 in the opening direction thereof is regulated by the receiving portion 104*a*. With the projected piece 702*g* of the first cover 702 abutting against the receiving portion 104*a*, the cartridge cover 701 maintains its opened state. With the projected piece 702*g* abutting against the receiving portion 104*a*, the center of gravity of the cartridge cover 701 (the center of gravity of a combination of the first cover 702 and the second cover 703) is set at such a position that the cartridge cover 701 maintains its opened position.

Even when an attempt is made to close only the image reading device 103 from a state in which the image reading device 103 and the cartridge cover 701 are opened, the force is transmitted in a direction in which the cartridge cover 701 is closed, by the image reading device 103. That is, when the image reading device 103 is closed from a state in which the image reading device 103 and the openable and closable cover are opened, the cartridge cover 701 contacts with the image reading device 103, whereby it is closed.

Figure 14:
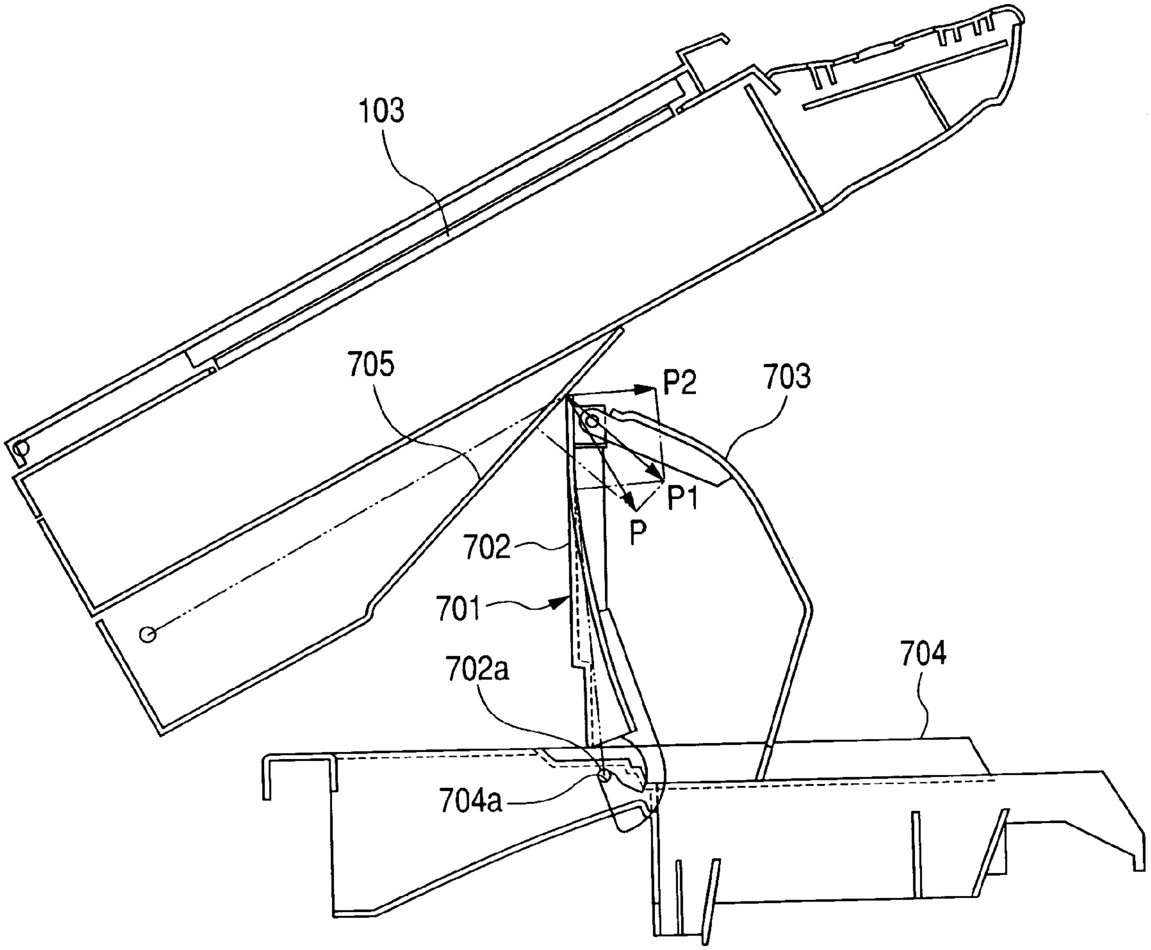
FIG. 14 is a cross-sectional view showing another embodiment.

When an attempt is made to close the image reading device 103 from the state in which the image reading device 103 and the cartridge cover 701 are opened, a cover guide 705 provided in the image reading device 103 abuts against an end portion of the first cover 702 (see FIG. 13). When the image reading device 103 is pivotally moved in a direction to be closed, the rotational force P of the image reading device 103 is divided into a component force P1 in the direction of the cover guide 705 orthogonal to the first cover 702. The first cover 702 is supported by the shaft 702*a*. The component force P1 is divided into a component force P2 in a direction orthogonal to a line linking the acting point of the component force P1 and the shaft 702*a* which provides the fulcrum of pivotal movement of the first cover 702 together. Accordingly, when the image reading device 103 abuts against the end portion of the first cover 702, a force in a direction to close the cartridge cover 701 is applied to the cartridge cover 701. The cover guide 705 is of a shape in which the rotational force P of the image reading device 103 provides a force for closing the cartridge cover 701. In the course of the pivotal movement of the image reading device 103 in a direction to be closed, the end portions of the cover guide 705 and the first cover 702 frictionally contact with each other. With the pivotal movement of the cover guide 705 in a direction to be closed, the first cover 702 (cartridge cover 701) is moved in a direction to be closed (see FIG. 14).

It is also possible to constitute the cover guide 705 by the frame member of the image reading device 103.

Figure 15:
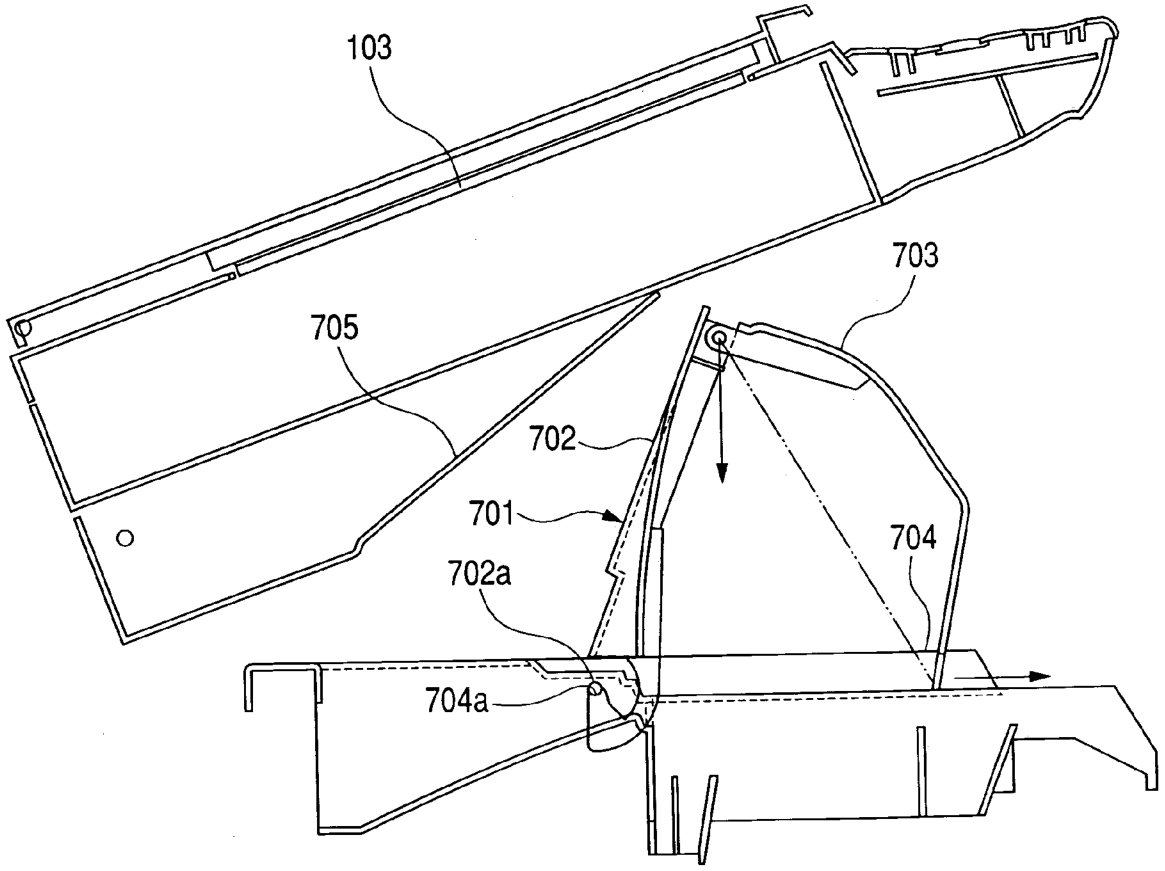
FIG. 15 is a cross-sectional view showing another embodiment.

When the position of the center of gravity of the cartridge cover 701 crosses over the pivot shaft 702*a* of the first cover 702, the cartridge cover 701 is closed by its own weight (see FIG. 15).

In the present embodiment, the length of the second cover 703 is made greater than the length of the first cover 702. Even in a state in which the cartridge cover 701 is opened, the distal end of the second cover 703 is in contact with the top cover 704. When a force for closing the cartridge cover 701 is applied to the cartridge cover 701, the distal end of the second cover 703 slides on the upper surface of the top cover 704 and therefore, the first cover 702 and the second cover 703 are prevented from being closed in a twice-folded state.

In a state in which the cartridge cover 701 is opened, the distal end of the first cover 702 is always in contact with the top cover 704. Consequently, even when the cartridge cover 701 has been closed without an operator being conscious of it, a thing is prevented from being nipped between the cartridge cover 701 and the apparatus main body 104 and being damaged thereby. A sound produced when the cartridge cover 701 is closed can be made small.

A damper D is provided between the first cover 702 and the second cover 703. The damper D produces the pivotal movement resistance of the cartridge cover 701 when the cartridge cover 701 is closed. The damper D suppresses a fall by gravity when the cartridge cover 701 is closed, and improves the sense of quality with which the cartridge cover 701 is closed. Also, the sound when the cartridge cover 701 has been unintentionally closed can be made very small.

A one-way damper may be provided between the first cover 702 and the second cover 703. In this case, it is possible to suppress the fall by gravity and improve the texture and make the sound small when the cartridge cover 701 is closed, and further to lightly open the cartridge cover 701 when it is to be opened. At this time, as compared with a case where the one-way damper is attached to an integral type cover, the moment to the gravity of the cartridge cover 701 may be small and therefore, an improvement in the texture and the effect of silencing can be obtained by a more inexpensive damper.

The upper surface of the top cover 704 and the distal end of the second cover 703 are smoothly formed with respect to the closing direction of the second cover 703. The design of the apparatus is made such that the level difference between the joint portions 702*e* and 703*c* is made concave on the downstream side with respect to the closing direction, whereby even if the cartridge cover 701 is released in the process of closing it, the cartridge cover 701 is closed by its own weight. Also, the cartridge cover 701 can be prevented from failing to be closed. At this time, the locking of the second cover 703 relative to the image forming apparatus main body 104 is set to the intensity with which the cartridge cover 701 is closed by its own weight.

The image reading device 103 is made pivotally movable relative to the image forming apparatus main body 104, whereby it can be disposed in further proximity to the image forming apparatus main body 104. Consequently, the color MFP apparatus can be made smaller. The opening angle of the image reading device 103 can be made small.

While in the above-described two embodiments, a description has been provided of the embodiment in which the number of the cartridge covers is two, a similar effect can also be obtained in the case of three or more cartridge covers by adjusting the opening angle. In a case where there are a plurality of second covers, the plurality of second covers are continuously foldably connected to the first cover so as to be folded and overlap that surface of the first cover which is adjacent to the apparatus main body. Accordingly, even in the case of an image forming apparatus in which the image reading device is not in the upper portion, when for example, the image forming apparatus is to be installed on a shelf, the interval between shelves can be made narrow and the space therebetween can be used effectively. Also, even in the case of an image forming apparatus in which the image forming apparatus in which the image reading device is provided in the upper portion, the mounting and dismounting port for mounting and dismounting a cartridge or the like therethrough is widely opened to thereby improve operability and yet, the height of the apparatus main body can be made small.

In the above-described two embodiments, there has been shown a construction in which both a process cartridge provided with an image bearing member and a developing cartridge, which is a toner cartridge, can be taken out through a mounting and dismounting port. However, the present invention can be applied to even a construction in which one of the process cartridge and the toner cartridge can be mounted and dismounted with respect to the apparatus main body through the mounting and dismounting port.

Also, the color MFP apparatus 101 according to the present embodiment has been shown as a construction having four developing cartridges for a single drum provided in a process cartridge. The present invention, however, can also be applied, for example, to a color electrophotographic recording apparatus of a construction provided with four process cartridges, or a construction provided with a plurality of developing cartridges, or a construction provided with a process cartridge having an intermediate transfer belt. Further, the present invention can be applied to even an image forming apparatus in which a process cartridge holding a photosensitive member therein and also containing a toner therein is detachably mountable with respect to an image forming apparatus main body. In such a color electrophotographic recording apparatus, all or some of the cartridges are interchanged from the upper part of the apparatus. Also, the present invention is effective for all apparatuses in which the upper cover of a recording portion is opened, including a monochrome electrophotographic recording apparatus in which, in order to make the height of the apparatus small, a process cartridge is flatly disposed to thereby make the process cartridge interchangeable from the upper part of the apparatus.

In the above-described embodiments, the cartridge cover has a plurality of cover members continuously connected together. On the apparatus main body side of one of the plurality of cover members which is rotatably provided in the apparatus main body, the remaining cover members are pivotably movable and therefore, the opening and closing area, particularly the height of the opening and closing area, of the cartridge cover can be made low to thereby narrow this area.

This application claims priority from Japanese Patent Application No. 2004-261616 filed Sep. 8, 2004, which is hereby incorporated by reference herein.

What is claimed is:

1. An image forming apparatus comprising:

an apparatus main body provided with an image forming portion configured to form an image and an opening formed in said apparatus main body;

an openable and closable cover configured and positioned to open and close the opening, and provided with a first cover pivotably provided in said apparatus main body, and a second cover pivotably provided on said first cover; and an image reading device provided above the opening for reading an image of an original, wherein when said first cover is pivotally moved in a direction to open the opening relative to said apparatus main body, said second cover is pivotably moved toward the opening relative to said first cover, and when said openable and closable cover has opened the opening, said openable and closable cover maintains a state in which said openable and closable cover has opened the opening.

2. An image forming apparatus according to claim 1, wherein when said openable and closable cover has opened the opening, said openable and closable cover is configured and positioned to maintain by its own weight a state in which said openable and closable cover opens the opening.

3. An image forming apparatus according to claim 1, wherein said image reading device is rotatably provided in said apparatus main body to open above the opening, and wherein the direction of rotation of said image reading device and the direction of pivotal movement of said first cover are the same.

4. An image forming apparatus according to claim 3, wherein when said image reading device is closed from a state in which said image reading device and said openable and closable cover are opened, said openable and closable cover is closed by abutting against said image reading device.

5. An image forming apparatus according to claim 3, further comprising coupling means for coupling said openable and closable cover and said image reading device so that said openable and closable cover is operatively associated with the rotation of said image reading device in the direction to open the opening.

6. An image forming apparatus according to claim 1, wherein when said openable and closable cover opens the opening, the angle of said second cover with respect to said first cover is kept at a predetermined angle, and when said openable and closable cover is closed from a state in which said openable and closable cover is opened, the angle of said second cover with respect to said first cover does not become smaller than said predetermined angle.

7. An image forming apparatus according to claim 1, further having a stopper configured and positioned to prevent said second cover from being pivotably moved to a side opposite to the opening relative to said first cover.

8. An image forming apparatus according to claim 1, wherein said image reading device is rotatably provided in said apparatus main body to open above the opening, wherein said openable and closable cover has an engaging portion which can engage said image reading device when said image reading device and said openable and closable cover are opened, and wherein said engaging portion restrains a rotation of said image reading device in a direction to be closed in a state that said openable and closable cover is opened.

9. An image forming apparatus according to claim 1, further comprising a damper provided between said first cover and said second cover configured and positioned to produce pivotal movement resistance of said openable and closable cover when said openable and closable cover is closed.

10. An image forming apparatus according to claim 1, wherein said second cover is longer than said first cover, and in the state in which said openable and closable cover opens the opening, a distal end of said second cover abuts against said apparatus main body.

11. An image forming apparatus according to claim 10, wherein when said openable and closable cover is closed from the state in which said openable and closable cover opens the opening, the distal end of said second cover frictionally contacts said apparatus main body.

12. An image forming apparatus according to claim 1, wherein the opening in said apparatus main body is configured such that at least one of an image bearing member and a toner cartridge mounted in said apparatus main body is dismountable from said apparatus main body through the opening.

13. An image forming apparatus comprising:

an apparatus main body provided with an image forming portion configured and positioned to form an image and an opening formed in said apparatus main body and communicating with an interior of said apparatus main body;

an openable and closable cover configured and positioned to open and close the opening, and provided with a first cover pivotably provided in said apparatus main body, and a second cover pivotably provided on said first cover; and an image reading device provided above the opening for reading an image of an original, wherein said image reading device is rotatably provided in said apparatus main body to open above the opening, wherein the direction of rotation of said image reading device and the direction of pivotal movement of said first cover are the same, and when said first cover is pivotably moved in a direction to open the opening relative to said apparatus main body, said second cover is pivotably moved toward said apparatus main body relative to said first cover.

14. An image forming apparatus according to claim 13, wherein when said openable and closable cover opens the opening, the angle of said second cover with respect to said first cover is kept at a predetermined angle, and when said openable and closable cover is closed from a state in which said openable and closable cover is opened, the angle of said second cover with respect to said first cover does not become smaller than said predetermined angle.

15. An image forming apparatus according to claim 13, further comprising a stopper configured and positioned to prevent said second cover from being pivotally moved to a side opposite to the opening relative to said first cover.

16. An image forming apparatus according to claim 13, wherein when said image reading device is closed from a state in which said image reading device and said openable and closable cover are opened, said openable and closable cover is closed by abutting against said image reading device.

17. An image forming apparatus according to claim 13, wherein said openable and closable cover has an engaging portion which can engage said image reading device when said openable and closable cover is opened, and wherein said engaging portion restrains a rotation of said image reading device in a direction to be closed in a state that said openable and closable cover is opened.

18. An image forming apparatus according to claim 13, further comprising coupling means for coupling said openable and closable cover and said image reading device so that said openable and closable cover is operatively associated with the rotation of said image reading device in a direction to open above the opening.

19. An image forming apparatus according to claim 13, further comprising a regulating member configured and positioned to regulate the pivotal movement of said first cover in the direction to open the opening, wherein said second cover is longer than said first cover, and in a state in which said first cover has its movement regulated by said regulating member, said openable and closable cover is maintained in a state in which said openable and closable cover opens the opening, and also a distal end of said second cover abuts against said apparatus main body.

20. An image forming apparatus according to claim 19, wherein when said openable and closable cover is closed from the state in which said first cover has its movement regulated by said regulating member, the distal end of said second cover frictionally contacts said apparatus main body.

21. An image forming apparatus according to claim 13, wherein the opening in said apparatus main body is configured such that at least one of an image bearing member and a toner cartridge mounted in said apparatus main body is dismountable from said apparatus main body through opening.

* * * * *

UNITED STATES PATENT AND TRADEMARK OFFICE
CERTIFICATE OF CORRECTION

PATENT NO. : 7,298,988 B2
APPLICATION NO. : 11/214935
DATED : November 20, 2007
INVENTOR(S) : Nakayama It is certified that error appears in the above-identified patent and that said Letters Patent is hereby corrected as shown below:

COLUMN 7:
Line 43, "shown)" should read --shown).--.

COLUMN 81:
Line 8, "through" should read --through the--.

Signed and Sealed this

Third Day of February, 2009

JOHN DOLL
*Acting Director of the United States Patent and Trademark Office*